United States Patent

Bono et al.

[11] Patent Number: 6,149,171
[45] Date of Patent: Nov. 21, 2000

[54] SPRING ISOLATOR FOR A MOTOR VEHICLE SUSPENSION

[75] Inventors: Mark J. Bono, Caton; Timothy S. O'Bryan, Sterling Heights; Scott A. Bone, Wixom, all of Mich.

[73] Assignee: DaimlerChrysler Corporation, Auburn Hills, Mich.

[21] Appl. No.: 09/282,359

[22] Filed: Mar. 31, 1999

[51] Int. Cl.[7] .................................................. B60G 11/99
[52] U.S. Cl. ...................................................... 280/124.179
[58] Field of Search ....................................... 280/124.179

[56] References Cited

U.S. PATENT DOCUMENTS

| | | |
|---|---|---|
| 1,507,009 | 9/1924 | Strietmann ........................ 280/124.179 |
| 3,781,033 | 12/1973 | Buchwald ......................... 280/124.179 |
| 3,901,494 | 8/1975 | Sena ................................. 280/124.179 |
| 4,033,605 | 7/1977 | Smith et al. . |
| 4,039,205 | 8/1977 | Castanier . |
| 4,165,098 | 8/1979 | Wagner . |
| 4,165,099 | 8/1979 | Wagner et al. . |
| 4,248,454 | 2/1981 | Cotter et al. . |
| 4,260,176 | 4/1981 | Pacis et al. . |
| 4,319,768 | 3/1982 | Youngdale . |
| 4,533,157 | 8/1985 | Hoenle et al. . |
| 4,577,534 | 3/1986 | Rayne . |
| 4,681,304 | 7/1987 | Hassan . |
| 4,747,587 | 5/1988 | Ferrel . |
| 4,804,169 | 2/1989 | Hassan . |
| 4,805,886 | 2/1989 | Hassan . |
| 4,813,704 | 3/1989 | Smith . |
| 4,973,075 | 11/1990 | Rori et al. . |
| 4,989,894 | 2/1991 | Winsor et al. . |
| 5,078,370 | 1/1992 | McClellan . |
| 5,286,052 | 2/1994 | Lukianov . |
| 5,308,048 | 5/1994 | Weaver et al. . |
| 5,342,029 | 8/1994 | Carter . |
| 5,362,035 | 11/1994 | Carter . |
| 5,375,870 | 12/1994 | Smith et al. . |
| 5,380,036 | 1/1995 | Perkins et al. . |
| 5,382,044 | 1/1995 | Smith et al. . |
| 5,487,535 | 1/1996 | Carter et al. . |
| 5,580,028 | 12/1996 | Tomczak et al. . |
| 5,601,304 | 2/1997 | Tilly et al. . |
| 5,758,896 | 6/1998 | Cruise . |
| 5,788,262 | 8/1998 | Dazy et al. . |
| 5,823,552 | 10/1998 | Etnyre et al. . |

*Primary Examiner*—Kenneth R. Rice
*Attorney, Agent, or Firm*—Marc Lorelli

[57] ABSTRACT

A suspension mechanism is provided for a motor vehicle including an axle, a spring seat, an isolator, and a coil spring. The spring seat is coupled to the axle and includes an aperture formed at a pre-selected location therein. An isolator is disposed on the spring seat and includes a locating member in the form of a projection extending therefrom. The projection engages the aperture in the spring seat so that the isolator assumes a preselected orientation relative to the spring seat when positioned thereon. A coil spring is secured to the isolator by a retention member in the form of an annular groove having a plurality of discrete protrusions overlapping the lowest coil of the coil spring. An orientation member in the form of a second projection is provided at a preselected location on the isolator. The second projection engages an end of the coil spring to that the coil spring assumes a preselected orientation relative to the isolator. The isolator also includes a plurality of notches formed about a perimeter thereof for interrupting a path for vibrations through the isolator.

16 Claims, 3 Drawing Sheets

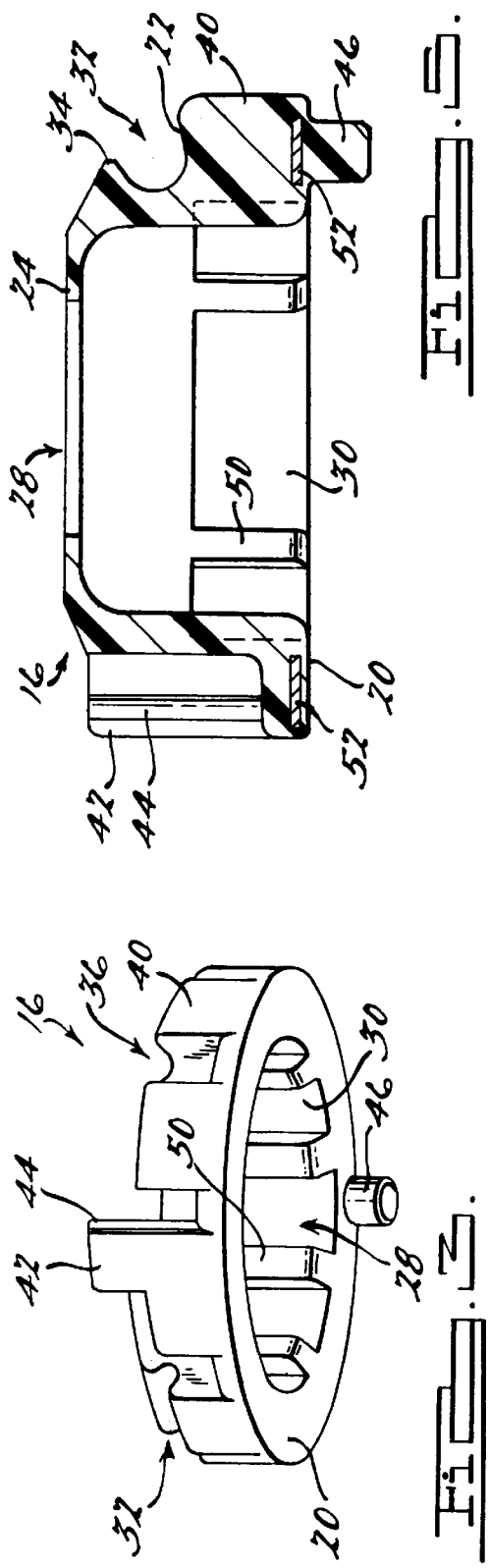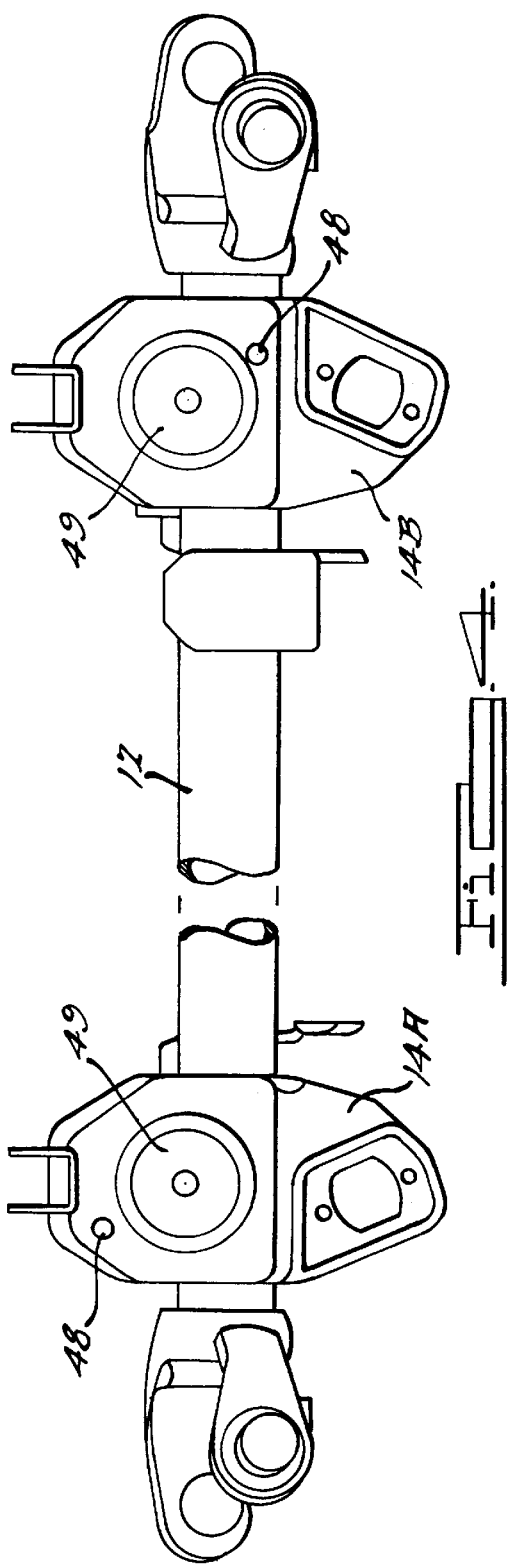

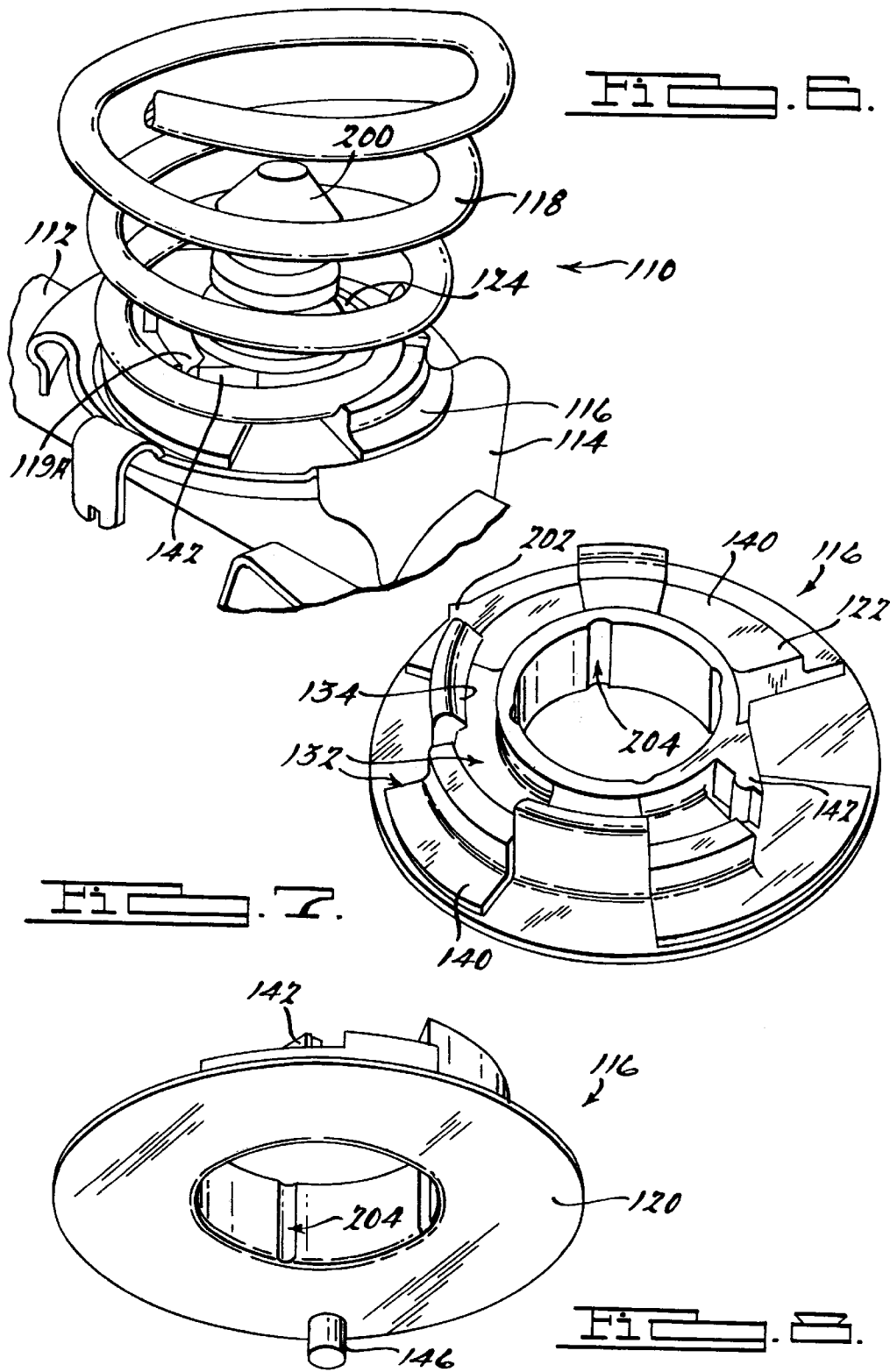

SPRING ISOLATOR FOR A MOTOR VEHICLE SUSPENSION

BACKGROUND OF THE INVENTION

1. Technical Field

The present invention generally relates to suspension systems for motor vehicles and, more particularly, to an isolator for controlling the orientation of the springs of the suspension system, supporting the springs during vehicle assembly, and reducing road noise and vibrations.

2. Discussion

Motor vehicles are typically provided with a suspension mechanism to reduce the transfer of vibrations from a driving surface to the vehicle occupants. Such suspension mechanisms often include one or more shocks, struts, and/or springs. One type of spring commonly used in suspension mechanisms is a coil spring.

A known characteristic of a coil spring is its tendency to curve or bow upon compression. That is, as the coils of the spring are forced together under an applied pressure, the spring tends to arc relative to its longitudinal axis. Since space within a vehicle underbody is limited, it is critical to prevent such bowing from causing the spring to impinge upon or otherwise interfere with the other components of the suspension system such as the wheels, rails, or various brackets. Currently, no mechanism is provided for controlling the direction of such bowing.

In some suspension mechanisms a resilient disk known in the art as an isolator is inserted between the coil spring and the spring seat. Such isolators serve to dampen the transmittance of vibrations to the springs. While such prior art isolators have proved effective for there intended purpose, there is room for improvement in the art. For example, the isolator may provide a convenient platform for mechanisms dedicated to controlling the bowing direction of the spring. Also, the solid disk geometry of prior art isolator designs may not be the optimum configuration for minimizing the transfer of vibrations. Further, the need for a discrete device to directly lock the coil spring to the spring seat may be eliminated.

In view of the foregoing, it would be desirable to provide an isolator for a suspension mechanism having an orientation member thereon for controlling the orientation of the coil spring relative to the isolator. It would also be desirable to provide an isolator with a locating member for controlling the orientation of the isolator relative to the remaining components of the suspension mechanism. Further, it would be desirable to provide an optimal geometry for the isolator for reducing the transfer of vibrations therethrough and to provide an integral mechanism to secure the coil spring to the spring seat during vehicle assembly.

SUMMARY OF THE INVENTION

The above and other objects are provided by a suspension mechanism for a motor vehicle including an axle, a spring seat, an isolator, and a coil spring. The spring seat is coupled to the axle and includes an aperture formed at a pre-selected location therein. An isolator is disposed on the spring seat and includes a locating member in the form of a projection extending therefrom. The projection engages the aperture in the spring seat so that the isolator assumes a preselected orientation relative to the spring seat when positioned thereon. A coil spring is secured to the isolator by a retention member in the form of an annular groove having a plurality of discrete protrusions overlapping the lowest coil of the coil spring. An orientation member in the form of a second projection is provided at a pre-selected location on the isolator. The second projection engages an end of the coil spring to that the coil spring assumes a preselected orientation relative to the isolator. By controlling the orientation of the isolator relative to the spring seat and the coil spring relative to the isolator, the coil spring is mounted in a pre-selected orientation relative to the other components of the suspension system. As such, the direction of the bowing of the coil spring is controlled. In a highly preferred embodiment of the present invention, the isolator includes a plurality of notches formed about a perimeter thereof for interrupting a path for vibrations through the isolator.

BRIEF DESCRIPTION OF THE DRAWINGS

In order to appreciate the manner in which the advantages and objects of the invention are obtained, a more particular description of the invention will be rendered by reference to specific embodiments thereof which are illustrated in the appended drawings. Understanding that these drawings only depict preferred embodiments of the present invention and are not therefore to be considered limiting in scope, the invention will be described and explained with additional specificity and detail through the use of the accompanying drawings in which:

FIG. 3 is a bottom perspective view of the isolator of FIGS. 1 and 2;

FIG. 4 is a top view of the axle and spring seat of the suspension mechanism of FIG. 1;

FIG. 5 is a cross-sectional view of the isolator of FIGS. 1–3;

FIG. 6 is a perspective view of a second embodiment suspension mechanism according to the present invention;

FIG. 7 is a top perspective view of the second embodiment isolator of FIG. 6; and FIG. 8 is a bottom perspective view of the second embodiment isolator of FIGS. 6 and 7.

DETAILED DESCRIPTION OF THE PREFERRED EMBODIMENTS

The present invention is directed towards an isolator for the coil spring of a suspension system in a motor vehicle. The isolator includes orientation members for positioning the isolator in a preselected orientation relative to a spring seat of the suspension system and for positioning the coil spring in a preselected orientation relative to the isolator. Accordingly, any bowing of the coil spring which occurs during compression is directed in a preselected manner. The isolator also includes a plurality of notches formed therein for minimizing the transfer of vibrations therethrough.

Figure 1:
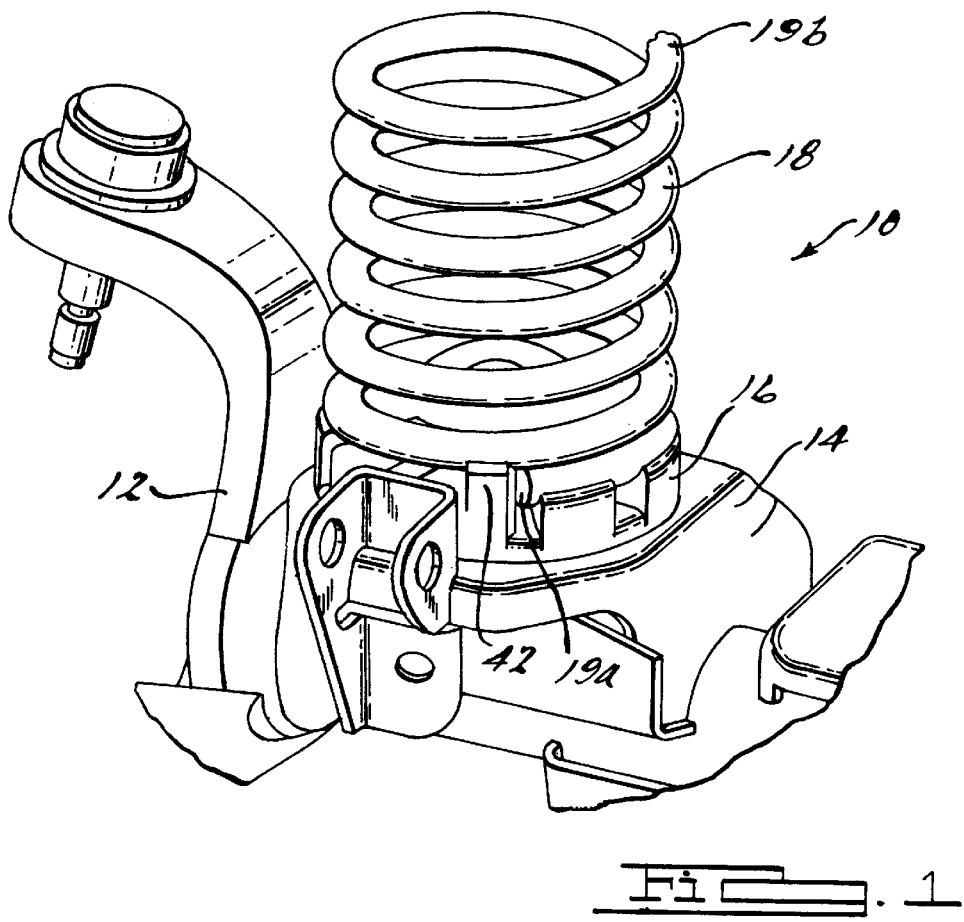
FIG. 1 is a perspective view of a suspension mechanism in accordance with the teachings of the present invention.

Turning now to the drawing figures, FIG. 1 illustrates a suspension system for a motor vehicle generally at 10. The suspension system 10 includes an axle 12, a spring seat 14, an isolator 16, and a coil spring 18. The spring seat 14 is connected to an outboard end of the axle 12 using conventional techniques such as welding. The isolator 16 is disposed on a top surface of the spring seat 14 in such a manner, as will be described in greater detail below, so that the isolator assumes a pre-selected orientation relative thereto. Similarly, the coil spring 18 is coupled to a top surface of the isolator 16 such that it assumes a pre-selected orientation relative thereto.

More particularly, the coil spring 18 includes a first end 19A and a second end 19B. In many applications, it is desirable to orient the ends 19A and 19B of the coil spring 18 180° apart. Due to the nature of a coil spring, when compressed, the coil spring tends to bow away from a plane wherein the ends 19A and 19B reside. Taking this characteristic into account, the end 19A is positioned so as to abut a portion of the isolator 16 which is held in a preselected location relative to the spring seat 14. As such, when a force is applied to the coil spring 18, any bowing thereof occurs in a preselected direction.

Figure 2:
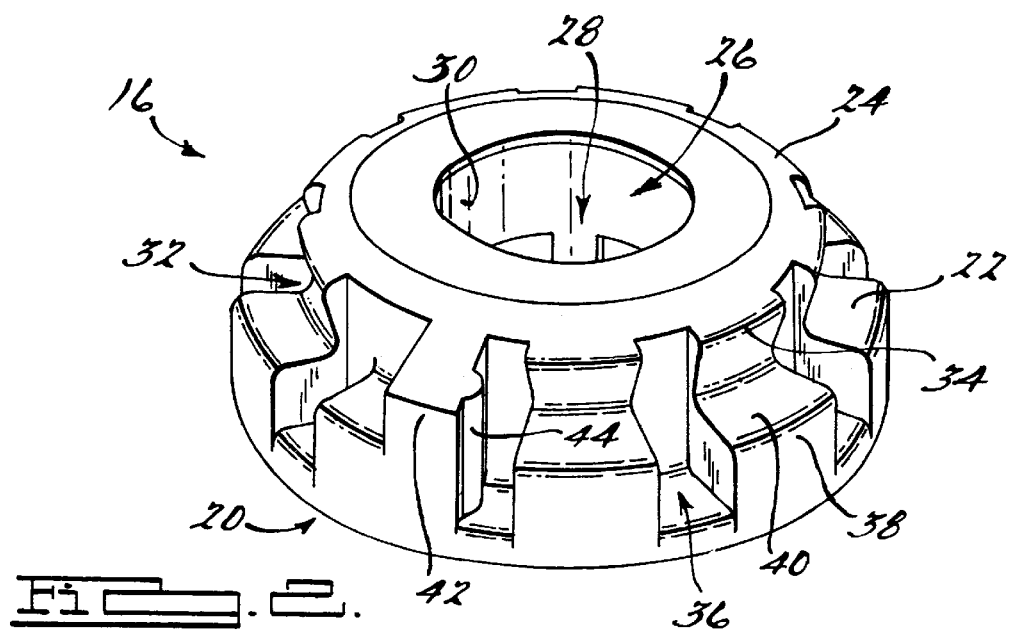
FIG. 2 is a top perspective view of the isolator of the suspension mechanism of FIG. 1.

Turning now to FIG. 2, a more detailed view of the isolator 16 is illustrated. The isolator 16 is generally donut-shaped and includes a first or bottom surface 20, a second or coil spring receiving surface 22, and a third or top surface 24. The isolator 16 is preferably formed of a resilient material and, in a preferred embodiment, is formed of rubber. The top surface 24 includes an aperture 26 formed therein providing access to a central passage 28 axially formed through the remainder of the isolator 16. The diameter of the aperture 26 is preferably smaller than the diameter of the passage 28 so that the top surface 24 forms an annular ring overhanging the passage 28. As one skilled in the art will appreciate, the overhanging top surface 24 and the inner perimeter 30 of the isolator 16 adjacent the passage 28 are configured to cooperate with a complimentary shaped surface (i.e., cylindrical) of the spring seat 14 (see FIG. 4).

The spring receiving surface 22 includes an annular groove 32 formed about a perimeter thereof for receiving the lowermost coil of the coil spring 18 (see FIG. 1). A plurality of protrusions or lips 34 radially project from a perimeter of the top surface 24 so as to form an annular ring overhanging the groove 32. The plurality of protrusions 34 form a retention member for securing the coil spring 18 to the isolator 16. This enables the coil spring 18 and isolator 16 to be preassembled and installed as a single unit into the suspension system 10. Although other designs are possible, it is presently preferred to form the top surface 24 and protrusions 34 such that they are angled towards the bottom surface 20. In this way, the coil spring 18 is encouraged toward the groove 32 when it is seated on the isolator 16. Also, since the protrusions 34 are preferably formed of flexible rubber, the coil spring 18 may be snap fit into the groove 32.

The isolator 16 also includes a plurality of notches 36 equidistantly formed about an outer perimeter thereof. More particularly, the notches 36 are formed in a fourth surface 38 of the isolator 16 which extends between the top surface 24 and bottom surface 20. The fourth surface 38 includes the spring receiving surface 22. The notches 36 subdivide the fourth surface 38 into a plurality of spokes or seats 40 radially extending form a root diameter of the isolator 16. The seats 40 individually accommodate discrete portions of the lowermost coil of the coil spring 18. Preferably, each seat 40 is aligned with a complimentary protrusion 34. By providing the notches 36, contact between the isolator 16 and the coil spring 18 is minimized. Such minimized contact enhances damping by interrupting paths for vibrations.

The isolator 16 also includes a spring orientation member 42 in the form of a nub or projection radially extending from the spring receiving surface 22 and top surface 24. The projection 42 preferably extends axially and radially through the groove 32 so as to provide a stop for interfering with the end 19A of the coil spring 18 (see FIG. 1). When the end 19A of the coil spring 18 abuts the projection 42, the coil spring is positioned in a preselected orientation relative to the isolator 16. If desired, the projection 42 may be provided with a wear enhancing feature that minimizes coil contact to rubber such as the half cylinder nub 44. Although the projection 42 is illustrated as being generally rectangularly shaped, other configurations may substitute therefore.

Referring now to FIG. 3, a bottom view of the isolator 16 is illustrated. The bottom surface 20 of the isolator 16 includes an isolator locating member 46 in the form of a nub or projection axially extending away from the bottom surface 20. Although the projection 46 may be formed at any location along the bottom surface 20, it is presently preferred to locate it approximately 160° to 200° away from the projection 42. More preferably, the projection 46 is located 175° away from the projection 42.

Referring now also to FIG. 4, the spring seats 14 coupled to axle 12 include a driver's side spring seat 14A and a passenger side spring seat 14B. Each spring seat 14A, B includes an aperture 48 formed therein. The aperture 48 is sized to accommodate the locating projection 46 of the isolator 16. Each spring seat 14A, B also includes a raised cylindrical surface 49 for cooperating with the inner perimeter 30 and top surface 24 of the isolator 16.

When the isolator 16 is properly disposed on spring seat 14A or B, the locating projection 46 nests within the aperture 48. As such, the isolator 16 as a whole, and the orientation projection 42 in particular, are located at a preselected position relative to the spring seat 14A, B. Since it is presently preferred to direct any bowing of the coil spring 18 outward and forward relative to the vehicle, the aperture 48 on spring seat 14A is located 180° opposite of the aperture 48 formed on the spring seat 14B. In this way, the orientation projection 42 of each isolator 16 is properly positioned for orienting the coil spring 18 in the preferred manner.

Still referring to FIGS. 3 and 4, the inner perimeter 30 of the isolator 16 includes a plurality of inwardly projecting axial ribs 50. The ribs 50 engage the cylindrical surface 49 of the spring seat 14. The ribs 50 also provide structural mass for the isolator 16 while minimizing available paths for vibrations through the isolator 16.

Referring now to FIG. 5, a cross-sectional view of the isolator 16 is shown. The isolator 16 is preferably formed of a resilient material such as rubber molded to its desired configuration including groove 32 and notches 36 over an inner metal ring 52. The metal ring 52 is preferably formed of steel and provides structure to the isolator 16 while efficiently distributing loads therethrough. The ring 52 also increases the durability of the isolator 16. The orientation projection 42 and locating projection 46 are preferably molded in place during formation of the isolator 16 and therefore are also formed of rubber. Also, the ribs 50 and overhanging top surface 24 are molded in place so as to compliment the configuration of the applicable spring seat 14.

Turning now to FIG. 6, a second embodiment suspension system 110 is illustrated. The suspension system 110 is identical in function to the first embodiment system 10 but includes an isolator 116 specifically tailored to accomodate the pigtail end and barrel shape of the coil spring 118. Such coil springs 118 are commonly employed in the rear suspension systems of modern motor vehicles.

The suspension system 110 includes an axle 112 having a spring seat 114 connected thereto. An isolator 116 is disposed on a top surface of the spring seat 114 so as to assume a pre-selected orientation relative thereto. A coil spring 118 is coupled to a top surface of the isolator 116. An end 119A of the coil spring 118 engages an orientation projection 142 on the isolator 116 so as to assume a preselected orientation relative thereto.

As stated above, the coil spring 118 has a pigtail type end. Upon compression, consecutive coils along the length of the coil spring 118 nest within one another. As such, rather than stacking axially upon one another when compressed, the coils of the coil spring 118 concentrically wrap one about the other. Since such a design configuration may result in the coil spring 118 compressing to a very small minimum height, the suspension system 110 includes a jounce bumper 200. The jounce bumper 200 may be disposed on a top surface 124 of the isolator 116 or on the raised surface of the spring seat 114 (see FIG. 4) and is preferably concentrically aligned therewith. Upon maximum compression of the coil spring 118, the jounce bumper 200 provides additional compression resistance.

Referring now to FIG. 7, a top view of the isolator 116 is illustrated. The spring receiving surface 122 of the isolator 116 includes the groove 132 formed therein. In this embodiment, the groove 132 is helically-shaped so that at least a portion of the lower two coils of the coil spring 118 (see FIG. 6) may be accommodated therein. To accommodate the additional lower coil, a retainer member in form of three protrusions 134 are employed about the innermost wrap of the groove 132. Each retainer protrusion 134 includes an overhanging lip to overlay the lowermost coil of the coil spring 118.

It is also preferred that the seats 140 be formed to differing heights so as to maintain the angle of the coils within the coil spring 118 when compressed. In this way, the seats 140 do not impose an undesirable bending moment or torque on the spring 118. In order to assist assembly, a tab 202 is provided on the perimeter of the isolator 116 at a preselected location. The tab 202 is used to align the isolator 116 relative to the spring seat 114. Although the tab 202 may be located at any location along the perimeter of the isolator 116, it is presently preferred to position it so as to be aligned with the locating projection 146 (see FIG. 8). The inner perimeter 130 of the isolator 116 also includes a plurality of channels 204.

Turning now to FIG. 8, a bottom view of the isolator 116 is illustrated. The locating projection 146 axially projects away from the bottom surface 120 of the isolator 116. As with the first embodiment, it is preferable to position the locating projection 146 approximately 160°–200° away from the orientation projection 142. The locating projection 146 is insertible within an aperture so as to cause the isolator 116 to be located in a preselected orientation relative to the spring seat (see FIG. 4). As such, the coil spring 118 is positioned such that bowing occurs in a preselected direction relative to the remainder of the suspension system 110.

Thus, the present invention provides an isolator for a suspension system of a motor vehicle including orientation features for orienting a coil spring relative to the remaining components of the suspension system. In this way, bowing of the coil spring upon compression occurs in a predetermined direction. Also, the isolator includes a retainer mechanism for securing the coil spring thereto such that both components may be assembled into the suspension system as a single unit. Further, a plurality of surface relief features in the form of notches are formed in the isolator to minimize contact between the isolator and coil spring so as to reduce the transfer of vibrations through the isolator to the coil spring.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification, and following claims.

What is claimed is:

1. An isolator for a suspension system including a coil spring comprising:

a first surface for supporting said isolator relative to a base structure;

a second surface for engaging said coil spring, said second surface including at least one notch formed therein for disrupting a vibration path through said isolator; and an orientation member on said second surface for orienting said coil spring relative to said second surface.

2. The isolator of claim 1 wherein said orientation member further comprises a projection for interfering with an end of said coil spring.

3. The isolator of claim 1 further comprising a locating member on said first surface for orienting said isolator relative to said base structure.

4. The isolator of claim 1 further comprising a retention member on said second surface for securing said coil spring to said second surface.

5. The isolator of claim 1 wherein said second surface includes a groove formed therein for receiving a lower coil of said coil spring.

6. The isolator of claim 1 wherein said at least one notch further comprises a plurality of notches formed about a perimeter of said second surface.

7. The isolator of claim 6 wherein said plurality of notches are equidistantly spaced about said perimeter.

8. An isolator for a suspension system including a coil spring comprising:

a first surface for supporting said isolator relative to a base structure;

a second surface for engaging said coil spring; and a projection on said first surface for orienting said isolator relative to said base structure by interfering with a recessed surface of said base structure.

9. An isolator for a suspension system including a coil spring comprising:

a first surface for supporting said isolator relative to a base structure;

a second surface for engaging said coil spring;

a third surface extending between said first surface and said second surface, said third surface including at least one notch formed therein; and an orientation member on said second surface for orienting said coil spring relative to said second surface.

10. The isolator of claim 9 wherein said at least one notch further comprises a plurality of notches formed about a perimeter of said third surface.

11. An isolator for a suspension system including a coil spring comprising:

a first surface for supporting said isolator relative to a base structure;

a second surface for engaging said coil spring; and a plurality of protrusions extending about a perimeter of said second surface so as to overlap a lower coil of said coil spring for securing said coil spring to said second surface.

12. The isolator of claim 11 wherein said plurality of protrusions are equidistantly spaced about said perimeter.

13. An isolator for a suspension system including a coil spring comprising:

a first surface for supporting said isolator relative to a base structure;

a second surface for engaging said coil spring; and at least one notch formed in said second surface for interrupting a vibration path between said first surface and said coil spring.

14. The isolator of claim 13 wherein said at least one notch further comprises a plurality of notches formed about a perimeter of said second surface.

15. The isolator of claim 13 wherein said plurality of notches are equidistantly spaced about said perimeter.

16. A suspension mechanism for a motor vehicle comprising:

an axle;

a spring seat coupled to said axle, said spring seat including an aperture formed therein;

an isolator disposed on said spring seat, said isolator including a first projection extending therefrom engaging said aperture of said spring seat such that said isolator has a pre-selected orientation relative to said spring seat, said isolator also including at least one notch formed therein for interrupting a path for vibrations through said isolator; and a coil spring coupled to said isolator by a retention member, said coil spring having an end engaging a second projection extending from said isolator such that said coil spring has a pre-selected orientation relative to said isolator.

* * * * *

UNITED STATES PATENT AND TRADEMARK OFFICE
CERTIFICATE OF CORRECTION

PATENT NO : 6,149,171
DATED : November 21, 2000
INVENTOR(S) : Bono et al.

It is certified that error appears in the above-identified patent and that said Letters Patent is hereby corrected as shown below:

Column 1, Item [75] Inventors: Mark J. Bono, Canton; Timothy S. O'Bryan, Sterling Heights; Scott A. Bone, Wixom, all of Mich.

Signed and Sealed this

Fifteenth Day of May, 2001

Attest:

NICHOLAS P. GODICI

Attesting Officer

Acting Director of the United States Patent and Trademark Office